United States Patent [19]

Hansen

[11] Patent Number: 4,988,154
[45] Date of Patent: Jan. 29, 1991

[54] METHOD AND APPARATUS OF PRODUCING AN ARCUATE RAINBOW HOLOGRAM

[75] Inventor: Matthew E. Hansen, Madison, Wis.

[73] Assignee: Wisconsin Alumni Research Foundation, Madison, Wis.

[21] Appl. No.: 245,723

[22] Filed: Sep. 16, 1988

[51] Int. Cl.⁵ .................. G03H 1/06; G03H 1/26; G03H 1/22

[52] U.S. Cl. .................. 350/3.86; 350/3.76; 350/3.85; 350/320

[58] Field of Search .............. 350/3.71, 3.85, 3.86, 350/3.76, 3.75, 320

[56] References Cited

U.S. PATENT DOCUMENTS

| | | | |
|---|---|---|---|
| 3,598,484 | 8/1971 | Redman et al. | 350/3.5 |
| 3,633,989 | 1/1972 | Benton | 350/3.86 |
| 3,784,276 | 1/1974 | Wuerker et al. | 350/3.5 |
| 3,832,027 | 8/1974 | King | 350/3.5 |
| 3,843,225 | 10/1974 | Kock et al. | 350/3.5 |
| 3,922,059 | 11/1975 | Noguchi | 350/3.71 |
| 3,942,861 | 3/1976 | George | 350/3.5 |
| 3,944,322 | 3/1976 | Benton | 350/3.5 |
| 4,206,965 | 6/1980 | McGrew | 350/3.76 |
| 4,235,505 | 11/1980 | Hariharan et al. | 350/3.77 |
| 4,283,109 | 8/1981 | Huff et al. | 350/3.76 |
| 4,339,168 | 7/1982 | Haines | 350/3.76 |
| 4,415,225 | 11/1983 | Benton et al. | 350/3.85 |
| 4,429,946 | 2/1984 | Haines | 350/3.76 |
| 4,512,624 | 4/1985 | Nicholson | 350/3.86 |
| 4,547,141 | 10/1985 | Rushmann | 350/3.61 |
| 4,787,688 | 11/1988 | Rumfola | 350/3.71 |
| 4,790,612 | 12/1988 | Dickson | 350/3.71 |
| 4,834,476 | 5/1989 | Benton | 350/3.86 |

FOREIGN PATENT DOCUMENTS 1116864 5/1985 U.S.S.R. ............ 350/3.85
1251015 8/1986 U.S.S.R. ............ 350/3.85

OTHER PUBLICATIONS

Bahuguna et al., "Simple Rainbow-Holographic Technique for Two-Dimensional Transparencies", *Optics Letters*, vol. 9, No. 9, Sep. 1984, pp. 381-383.

*Primary Examiner*—Bruce Y. Arnold
*Assistant Examiner*—Terry S. Callaghan
*Attorney, Agent, or Firm*—Foley & Lardner

[57] ABSTRACT

A two-dimensional, white light illuminable arcuate rainbow hologram that is potentially viewable from 360° is formed by limiting the information content of a wave front representing a reflection of monochromatic coherent light off of the object desired to be holographed. The information content is limited to a selected portion of the wave front, the selected portion passing through or upon an arcuate window which preserves the selected portion. The arcuate window is formed using an arcuate aperture, a flat arcuate master hologram, or a cylindrical shell of laser light used as a reference beam. The arcuate rainbow hologram is viewable from 360° if the arcuate window is annular, i.e. circular. If the window is a half-circle or other arc angle, the window of viewability will correspond to the angle of the arcuate window that limits the information content of the wave front representing the reflection of monochromatic coherent light off of the object to be holographed. The arcuate rainbow hologram may also be multiplexed, where the "object" is a set of two-dimensional images of a subject from different perspectives.

62 Claims, 10 Drawing Sheets

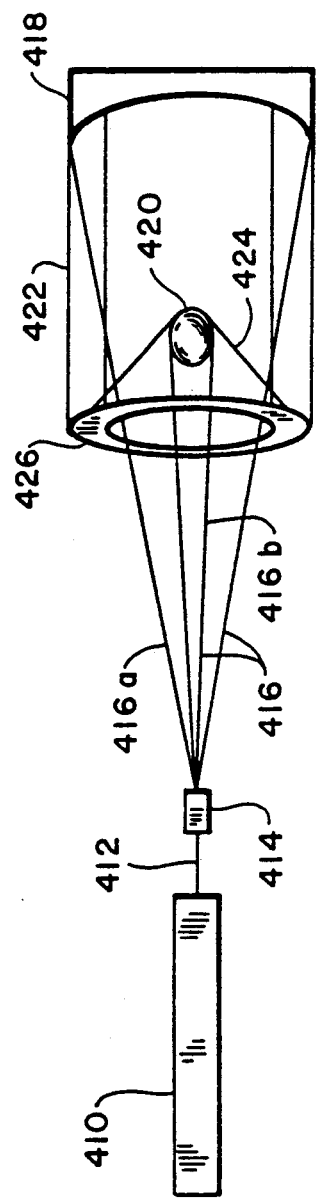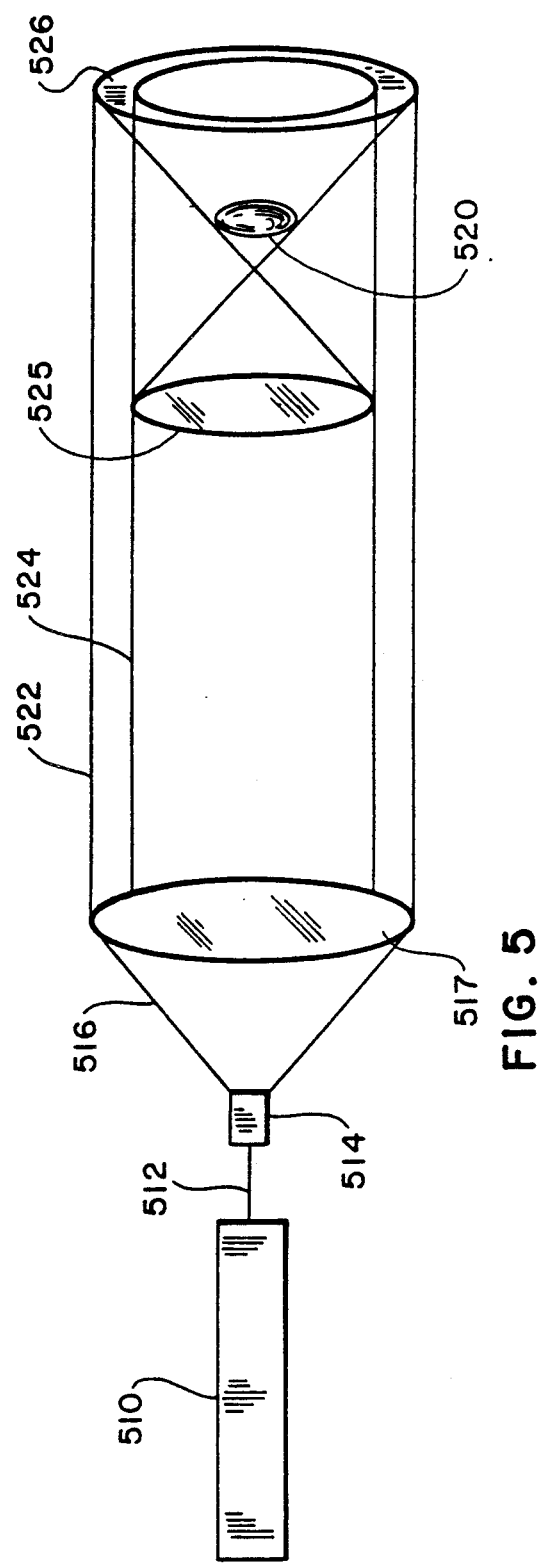

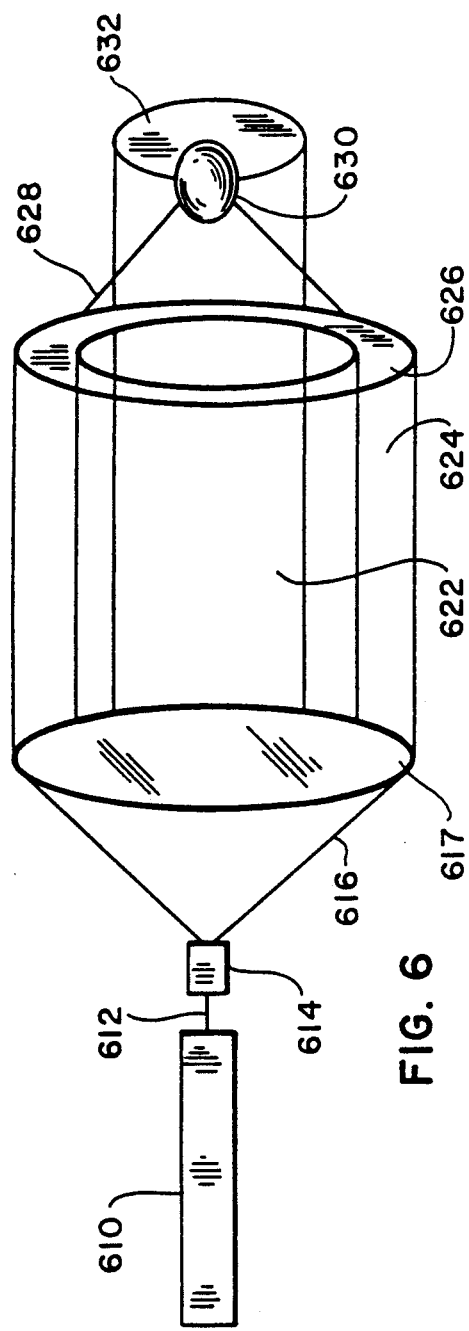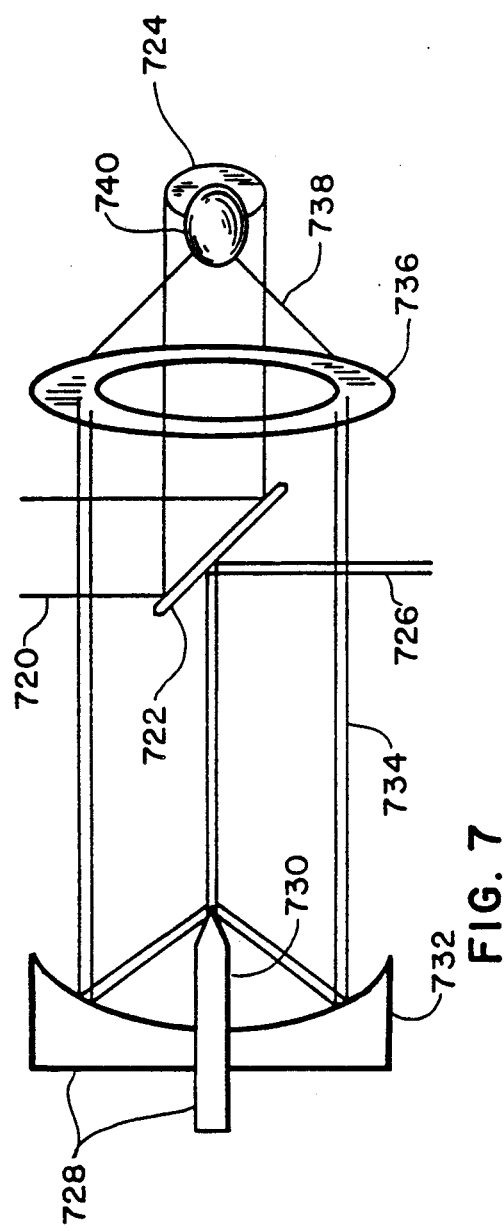
FIG. 6
FIG. 7

METHOD AND APPARATUS OF PRODUCING AN ARCUATE RAINBOW HOLOGRAM

FIELD OF THE INVENTION

This invention relates generally to holography, and particularly to holograms of the rainbow variety, which are illuminable by white light.

BACKGROUND OF THE INVENTION

A hologram is a three-dimensional image of an object that has been recorded and is later reproducible. The recordation of a hologram requires the use of a monochromatic coherent light source that is split into two components. One of the components of the coherent light source is used to illuminate an object whose photographic image is to be recorded. The light waves that are reflected from the object contain all possible optical information regarding the object and subsequently impinge upon a photographic plate which is exposed by the light waves reflected by the object. The second component of the coherent light is incident upon the same photographic plate and has a wave front of known and reproducible form, known as the reference beam. The wave front of the reference beam and the light waves reflected from the object interfere to create a diffraction pattern uniquely related to the object, which is the hologram.

In classical holography, the image of the object is reproduced by viewing in a beam of monochomatic coherent light similar to that of the reference light. The coherent light is diffracted by the hologram identical in form and direction to that originally emanating from the object, and an observer viewing this diffracted wave front sees a three-dimensional stereoscopic image of the original object.

The reconstruction of the holographic image as just described requires illumination by a laser to create the necessary diffraction pattern. The laser beam must have the appropriate orientation and cross-sectional area. However, there exist techniques for producing information limited holograms that are viewable under white light. An example of this is described in U.S. Pat. No. 3,633,989 issued to Benton entitled "Method for Making Reduced Bandwith Holograms," and commonly referred to as a rainbow hologram. U.S. Pat. No. 3,633,989 describes two processes for the making of orthoscopic holographic images. One of these involves the preparation of a hologram, which, upon illumination with a monochromatic coherent light beam conjugate to the reference beam used in recording, yields a parallax limited real pseudoscopic image. This real image is then holographically recorded to form a second hologram. The second hologram, when illuminated by a beam conjugate to the reference beam used in recording it, yields a real orthoscopic image. The second approach described in U.S. Pat. No. 3,633,989 comprises holographically recording an image of an object formed by a lens provided with an elongated horizontal slit aperture with the aid of a diverging reference beam. Illumination of the hologram so formed with a converging beam conjugate to the source produces a real image of the slit aperture through which a real orthoscopic image of the scene or object can be viewed.

Other setups and methods of producing rainbow holograms have been proposed A common element of all these methods to create the rainbow holograms of the prior art, however, is the use of a straight, horizontal slit aperture or masking means having a large aspect ratio to limit the amount of information in the recorded hologram. The straight, horizontal slit rainbow hologram eliminates vertical parallax without sacrificing a three-dimensional appearance, since depth perception depends essentially upon the horizontal parallax Since the illuminating light is white light, a series of strips of different colors are formed The color of the image changes from red to violet as the observer lowers his or her eye position, which is the reason this type of hologram is referred to as a rainbow hologram.

The image of a hologram produced using a straight, horizontal slit aperture may therefore be seen only from a certain "window" in front of the hologram. The window of visibility is dictated by the length of the slit relative to the size of the object. Thus, if a hologram is mounted on a wall as a picture, the hologram may be viewed from directly in front and from either side up to a certain distance. If one moves further to the side, the image abruptly disappears. If one moves up or down the color of the hologram varies through and beyond the visible spectrum. Thus, eventually one sees a red image and then nothing as the spectrum moves into the infrared. Similarly, at the other extreme, the image disappears as one goes beyond the visible blues.

The use of a straight, horizontal slit aperture in the formation of a rainbow hologram therefore forms a window of visibility having no vertical parallax and a horizontal viewing angle that is ordinarily dictated by the length of the slit, the viewing angle usually being much less than 180°. There are instances, then, where the hologram may be positioned in such a manner that this particular viewing window is not optimal An example would be a two-dimensional rainbow hologram which is positioned to lie flat on a table or inlaid into its surface such that the viewer cannot lean over to view the hologram directly. Under such circumstances, the viewing zone provided by the straight, horizontal slit aperture proves inadequate.

There are holograms of the prior art which can provide up to a 360° view of an object. See, for example, U.S. Pat. Nos. 3,784,276 issued to Wuerker et al. and 4,339,168 issued to Haines. These holograms are typically recorded by use of a right circular cylinder of film which surrounds the object. For reproduction purposes, the arrangement is the same except that the object is removed. Though cylindrical holograms provide a 360° viewing angle, such holograms and similar deviations therefrom (such as a conical shape) require a less convenient three-dimensional format. Generally, the two-dimensional format is preferred because of a greater number of applications available for use. Rainbow holography is capable of reducing three-dimensional imagery to a two-dimensional format and subsequently reconstructing the three-dimensional imagery, though, as described above, current rainbow holography methods have restricted viewing angles.

SUMMARY OF THE INVENTION

The arcuate rainbow hologram of the present invention is two-dimensional, white-light viewable, and has a potential window of visibility of up to 360°. When the hologram is positioned flat upon a horizontal surface and lit by a white light directly above or below, a viewer can establish a line of sight to the holographic image from any location around the periphery of the hologram. The window of viewability available under white light forms the shape of a truncated cylinder shell and the viewer must look through this window to see the holographic image. When the arcuate rainbow hologram is positioned horizontally, the color of the image changes through and beyond the visible spectrum as the viewer moves upward or downward relative to the horizontal hologram. Thus, the holographic image will be invisible when the hologram is viewed straight on and will enter the visible spectrum as blue, change through the color spectrum to red, and then become invisible again as one lowers their position relative to the horizontal hologram.

The hologram is formed by limiting the information content of a wave front representing the object beam to a selected portion forming a narrow arcuate window through which the selected portion is preserved. Other portions of the wave front are discarded. The narrow arcuate window may be formed by various means; for example, the wave front may be limited by occluding all but a selected portion of the object beam through an arcuate aperture, the photographic plate which receives the interference between the object and reference beams may be shaped arcuately when a matter is used and later re-illuminated, or the master may be illuminated by a cylindrical shell of laser light to form an information-limited reconstructing beam which represents the object beam. The reference beam that makes the master may also be the information-limiting mechanism if it is arcuately shaped.

The narrow arcuate window through which the selected portion of the wave front representing the object beam is preserved may be annular, i.e. circular, or it may be a half-circle or arc of varying lengths. The arcuate rainbow hologram will be viewable from 360° where the information content of the wave front has been limited to a window which is annular. Any window which limits the information content of a wave front representing the object beam to a section less than that which forms a complete circle will form a corresponding window of viewability which is less than 360° by the same amount.

The arcuate rainbow hologram finds applications in items in which a 360° window of viewability would find utility. Holograms which lie flat in a horizontal plane and are viewable from around their periphery are better adapted to a 360° window of viewability. Examples are decorative tables and table inlays, displays and display cases, bank notes, credit cards, flooring and ceiling tiles, counters and shelving, LP records and compact discs, etc. The invention may also find applications in non-visible electromagnetic radiations such as ultraviolet, infrared, X-ray, and radar. Arcuate or annular rainbows may be used to separate color (frequency) into bands or rings of radiation and may be used as monochromators, frequency sorters, or spectrum analyzers.

The use of a narrow arcuate window to limit the information content of a resultant hologram is also adaptable to multiplex holograms. In such a case, the "object" to be recorded is a sequence of two-dimensional images of a subject from different perspectives. The "object beam" in a multiplex hologram is a succession of projected two-dimensional images which are then recorded in an arcuate geometry, each of the images occupying a narrow wedge or short arc of the total arcuate shape. The arcuate rainbow multiplex hologram has applications in architecture, medical imaging, remote sensing, computer graphics, microscopy, and any application where circular or arc-shaped perspective sets are recorded, computer generated, or computer manipulated.

Further objects, features, and advantages of the invention will be apparent from the following detailed description taken in conjunction with the accompanying drawings.

BRIEF DESCRIPTION OF THE DRAWINGS

In the drawings:

FIG. 4 is a schematic diagram of the first step in a single beam two-step arrangement or the first step in a two beam two-step arrangement in the creation of an arcuate rainbow hologram of an opaque object.

FIG. 5 is a schematic diagram of the first step in a single beam two-step arrangement or the first step in a two beam two-step arrangement in the creation of an arcuate rainbow hologram of a translucent object.

FIG. 6 is a schematic diagram of the second step in a single beam two-step arrangement in the creation of an arcuate rainbow hologram.

FIG. 7 is a schematic diagram of the second step in a two beam two-step arrangement in the creation of an arcuate rainbow hologram.

DESCRIPTION OF THE PREFERRED EMBODIMENT

Figure 1:
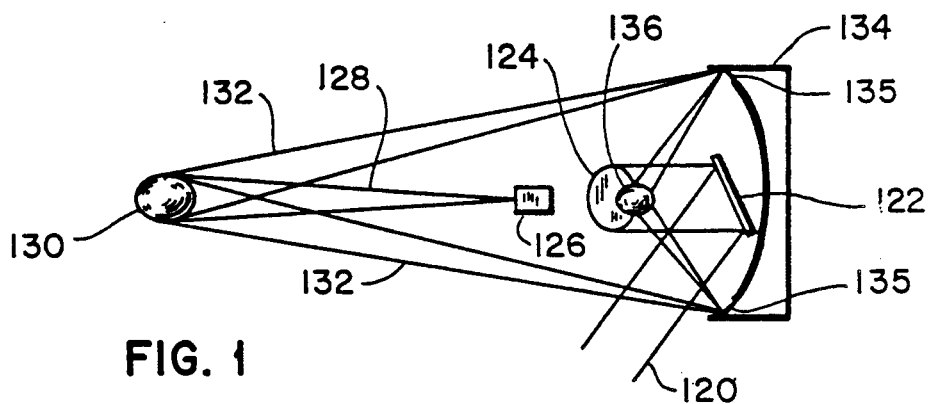
FIG. 1 is a schematic diagram of a two beam one-step arrangement in the creation of an arcuate rainbow hologram having a pseudoscopic image.

With reference to the drawings, FIGS. 1-7 and 10-12 show various construction geometries that may be used in the creation of an arcuate rainbow hologram in accordance with the present invention. Throughout this specification, the terms "image-receiving surface" and "photographic plate" should be understood to include, but not limited to, photographic film, holographic film, photoconductive thermoplastics, photopolymers, electronic cameras, electro-optic and photorefractive crystals. It is to be understood that an "object" may be a person, thing, scene, or and other subject which is to be represented by the hologram. An "object" is further defined as a single, three-dimensional object, or a set of two-dimensional images that represents a three-dimensional object. An object may be either opaque or translucent. The terms "lens," "mirror," and "optic" should be understood in their broadest sense to be reflective, refractive, diffractive elements, and their equivalents, including classical glass or metal optics, diffraction gratings, holograms, holographic optical elements (HOEs), computer generated holograms (CGHs), kinoforms, and spatial light modulators (SLMs). FIG. 1 shows a two beam one-step arrangement that results in a pseudoscopic (also referred to as "conjugate") image. The pseudoscopic image looks to the viewer as if the image is inside out, and may be of use in some decorative applications. A reference beam 120 of monochromatic coherent light, preferably though not necessarily collimated, is reflected off of a mirror 122 and directed to impinge upon an image-receiving surface 124 such as a photographic plate. A monochromatic coherent light beam which is of similar wavelength to the reference beam 120 is directed through a spatial filter 126 having an objective lens which expands the beam to form an illuminating beam 128 that is directed at, and illuminates, an opaque three-dimensional object 130 which is desired to be represented as a hologram. The reference beam 120 and the illuminating beam 128 typically will originate from the same monochromatic light source and be split at a beam splitter (not shown). The illuminating beam 128 is reflected and scattered off of the opaque object 130 to form an object beam 132. The wave front of the object beam 132 is related to the three-dimensional opaque object 130 in that the wave front contains optical information necessary to reproduce a three-dimensional stereoscopic view of the three-dimensional object 130. The object beam 132 is received by an imaging mirror 134 where the object beam 132 is redirected to form a pseudoscopic real image 136 which interferes with the reference beam 120. The imaging mirror 134 is masked off except for an arcuate slit aperture positioned upon the mirror 134 at 135, preferably annular, the imaging mirror 134 thereby reflecting only that portion of the object beam 132 which is allowed to pass through the arcuate slit aperture 135. The arcuate slit aperture 135 thereby reduces the information content of the wave front of the object beam 132 to a selected portion of that wave front. The selected portion of the wave front is arcuate, corresponding to the arcuate geometry of the arcuate slit aperture. Those portions of the object beam 132 that are incident to a window formed by the geometry of the arcuate slit 135 aperture are preserved, whereas the remainder of the wave front of the object beam 132 is occluded and discarded. The arcuate slit aperture 135 may optionally be placed at a distance set off from the imaging mirror 134, so long as it is located in the path of the object beam 132. The position of the arcuate slit aperture 135 determines the appropriate viewing distance and is best determined by the size of the final hologram but is not critical. The optical interference of the reference beam 120 and the object beam 132 creates a diffraction pattern that is uniquely related to the three-dimensional object 130 and converts the resultant phase modulation into recordable quantity. The image-receiving surface 124 is located proximate to the real image 136 and records the image 136. The image recorded upon the image-receiving surface 124 is a stereoscopic three-dimensional holographic image of the three-dimensional object 130 with reduced information content. It is noted that though the image 136 is pseudoscopic, this system produces an orthoscopic (true) image with mirror image handedness if the hologram is illuminated from the emulsion side of the film. The orthoscopic or pseudoscopic nature of the image 136 is also a function of the imaging distances of the slit and three-dimensional object 130.

Figure 2:
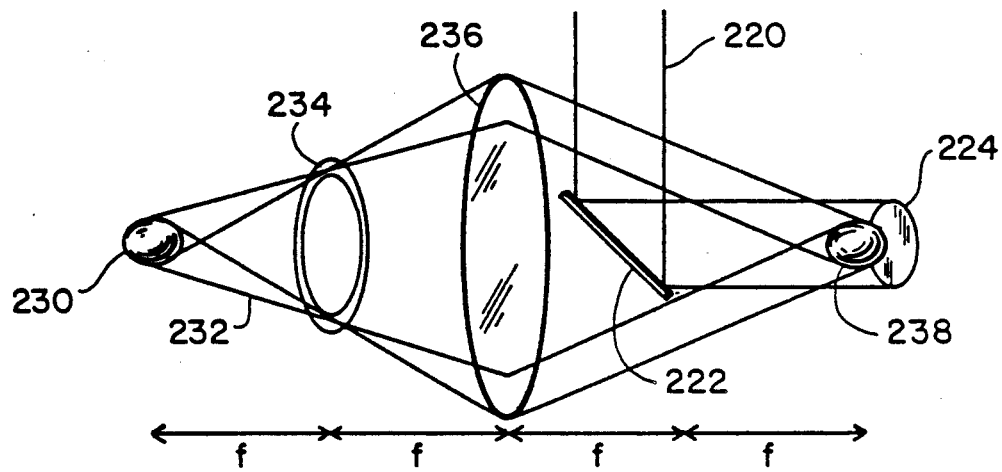
FIG. 2 is a schematic diagram of a two beam one-step arrangement in the creation of an arcuate rainbow hologram having an orthoscopic image.

FIG. 2 shows an arrangement for the creation of an orthoscopic (true) two beam one-step arcuate rainbow hologram. A reference beam 220 of monochromatic coherent light, preferably collimated, is reflected off of a mirror 222 and directed to impinge upon an image-receiving surface 224. A three-dimensional object 230 is illuminated by an illuminating beam (not shown) created by a monochromatic coherent light source (not shown), the reflections of which form an object beam 232. The reference beam 220 and the illuminating beam typically will originate from the same monochromatic coherent light source and be split at a beam splitter (not shown). The object beam 232 is directed through an arcuate aperture 234, preferably annular, which reduces the information content of the object beam 232. An imaging lens 236 receives the diverging object beam 232 and redirects the beam to converge and form an orthoscopic image 238 which interferes with the reference beam 220. The optical interference of the reference beam 220 and the object beam 232 creates a diffraction pattern that is uniquely related to the object 230 and converts the resultant phase modulation into recordable quantity. The image-receiving surface 224 is located proximate to the orthoscopic real image 238 to record the image 238. The image recorded upon the image-receiving surface 224 is a stereoscopic three-dimensional holographic image of the three-dimensional object 230 with reduced information content. In FIG. 2, the distance between the three-dimensional object 230 and the arcuate aperture 234, and the arcuate aperture 234 and the imaging lens 236, are each one focal length. The distance between the imaging lens 224 and the image-receiving surface 228 is two focal lengths. 1:1 or 4f imaging as herein described is convenient, but not necessary. In this system the slit and object locations may be varied to produce magnified, minified, orthoscopic, or pseudoscopic holograms.

Figure 3:
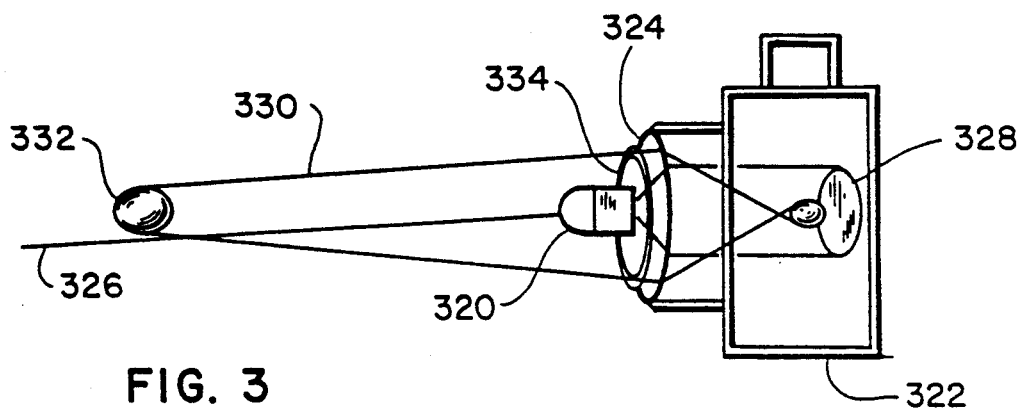
FIG. 3 is a schematic diagram of a camera setup for a two beam one-step arrangement in the creation of an arcuate rainbow hologram having an orthoscopic image.

The above two beam one-step arrangements are simple and well-suited to a single-shot holographic camera. Minification imaging can be used to create small arcuate rainbow holograms of large holographic objects. The two beam one-step implementation affords the use of an optical fringe stabilizer and beam ratio control via a variable beam-splitter. FIG. 3 shows a crude but exemplary two beam one-step camera arrangement. A small 90 power microscope objective 320 may be affixed to the center of a clear filter that screws onto the front of a standard camera 322 with a lens 324, typically 50 mm. A monochromatic coherent reference beam 326 created by a laser (not shown) is directed at the camera 322; the reference beam 326 is expanded by the objective 320, collimated by the lens 324, and is incident upon a film plane 328. An object beam 330 emanating from a three-dimensional object 332 desired to be holographed has its information content limited by an annular aperture 334 whose exterior and interior diameters are limited by the lens 324 and the outer edge of the objective 320, respectively. The simple unexpanded reference beam 326 and a well-lit object 322 will produce a small arcuate rainbow hologram as shown in FIG. 3. It is to be understood that modifications must be made to the arrangement of FIG. 3 to produce a hologram of any quality.

There are some disadvantages to the two beam one-step arcuate rainbow hologram implementation. The first disadvantage is the need for a large aperture low f/# lens or imaging mirror. A second disadvantage is the high light loss due to the arcuate slit aperture. A third disadvantage is that the process does not generate a master hologram that may be filed in a permanent image library for future use. These disadvantages are eliminated by the use of a two-step arcuate rainbow process, explained below.

FIG. 4 shows an arrangement for practicing the first step of a single beam two-step geometry in the formation of an arcuate rainbow hologram. A monochromatic coherent light beam 412 from a laser 410 is directed through a spatial filter 414 having a microscopic objective to form an expanded beam of coherent light 416. One component 416a of the expanded beam 416 is directed at a collimating mirror 418, whereas a second component 416b of the expanded beam 416 is directed at, and illuminates, an opaque three-dimensional object 420. The component 416a is reflected off of the collimating mirror 418 to form a collimated beam of light which is a reference beam 422. The light component 416b is reflected and scattered off of the opaque three-dimensional object 420 to form an object beam 424. The wave front of the object beam 424 is related to the three-dimensional object 420 in that the wave front contains optical information necessary to reproduce a three-dimensional stereoscopic view of the object 420. Both the reference beam 422 and the object beam 424 are incident on an image-receiving surface 426, or other light-sensitive material. The image-receiving surface 426 is arcuately shaped and thereby acts to limit the information content of the wave front of the object beam 424 to a selected portion of that wave front. The selected portion of the wave front is arcuate, corresponding to the arcuate geometry of the image-receiving surface 426. Those portions of the object beam 424 that are incident to a window formed by the geometry of the image-receiving surface 426 are thereby preserved, whereas the remainder of the wave front of the object beam 424 is discarded An alternate means of limiting the information content of the recorded image is to form the reference beam 422 in an arcuate geometry. This is accomplished in the arrangement of FIG. 4 by masking the collimating mirror 422 to create an arcuate reference beam reflection that interferes wit the object beam 424 to create a recordable quantity that is arcuate in shape.

FIG. 5 shows an alternate first step arrangement of a single beam two-step geometry in the formation of an arcuate rainbow hologram. This geometry is designed for use when the objects desired to be represented on the hologram are translucent rather than opaque. A monochromatic coherent light beam 512 from a laser 510 is directed through a spatial filter 514 having a microscopic objective to form an expanded beam of coherent light 516. The expanded beam 516 strikes a collimating lens 517; one component of the expanded beam 516 after collimation is a reference beam 522 and a second component of the collimated beam 516 is an illuminating beam 524. The object beam 524 is directed toward a lens 525 which converges the beam toward a translucent three-dimensional object 520. The translucent three-dimensional object 520 is placed just beyond the focal point of the lens 525 in an area where the illuminating beam 524 is diverging. The reference beam 522 and the resultant diffraction and scattering of the object beam 524 after the object beam 524 strikes the translucent object 520 are incident upon an image-receiving surface 526, or other light-sensitive material. The image-receiving surface 526 is again shaped in an arcuate geometry to limit the wave front of the object beam 524.

FIG. 6 shows the second step of the single beam two-step arcuate rainbow hologram, applicable as a second step to follow either of the first steps of FIGS. 4 or 5. A laser 610 produces a monochromatic light beam 612 that is directed through a spatial filter 614 having a microscopic objective to form an expanded beam of coherent light 616. The expanded beam 616 strikes a collimating lens 617; one component of the expanded beam 616 after collimation is a reference beam 622 and a second component of the collimated beam 616 is an illuminating beam 624. The illuminating beam 624 strikes and illuminates a master 626 (sometimes referred to as "H1") which is developed from either of the image-receiving surfaces 426 or 526. A reconstructing beam 628 emanating from the illuminated master 626 forms a real image 630 which is recordable upon combination with the reference beam 622. The recordation is made on a second image-receiving surface 632. The holographic image recorded on the second image-receiving surface 632 (sometimes referred to as "H2") is a three-dimensional image of limited information content. A single beam two-step arcuate rainbow hologram may be built by developing the master 626 in situ, replacing the collimating mirror 418 of FIG. 4 with holographic film (the second image-receiving surface 632, H2) for the second exposure, and expanding the single beam to illuminate the master 626. Despite the advantage of the single beam two-step arcuate hologram over the two beam one-step arcuate hologram (FIGS. 1, 2, and 3), the single beam two-step arcuate rainbow suffers from potential disadvantages. The beam ratio must be controlled by changing the beam expander focal power. This implementation results in high light loss when re-illuminating the master 626 during the second exposure.

In order to remedy the beam ratio and light loss problems, a two beam two-step embodiment to form an arcuate rainbow hologram may be implemented. The two beam two-step method utilizes the same first step as the single beam two-step geometries as depicted in FIGS. 5 and 6. The second step differs, however, and is as shown in FIG. 7. A reference beam 720 of monochromatic coherent light, preferably collimated, is reflected off of a two-sided mirror 722 and directed to impinge upon an image-receiving surface 724. A second beam of monochromatic coherent light 726 is reflected off of the opposing side of the two-sided mirror 722 and directed toward an axicon 728 which is a ring optic comprised of a polished expander cone 730 and a collimating mirror 732. The purpose of the axicon 728 is to change the beam 726 into a cylindrical shell of monochromatic coherent light that is an illuminating beam 734, usually laser light. By sliding the expander cone 730 forward or backward along the optic axis, a converging or diverging shell of adjustable radius is produced. The cylindrical shell of the illuminating beam 734 is used to illuminate a master 736 (H1) which is developed from either of the image-receiving surfaces 426 or 526. The radius of the illuminating beam 734 is adjusted so that the cylindrical shell of laser light is the radius of the desired cylindrical viewing window and the thickness is the desired master 736 slit width. The illumination of the master 736 forms a reconstructing beam 738 which forms a real image 740. The image-receiving surface 724 is placed proximate to the real image 740, and, in combination with the reference beam 720, records the image 740. The use of a cylindrical shell of laser light which is adjustable in thickness, radius, and divergence angle as an illuminating beam 734 serves as a means of limiting the information content of the reconstructing beam 738, since only that portion of the master 736 which is illuminated will form a reconstructing beam 738 which interferes with the reference beam 720.

Figure 8:
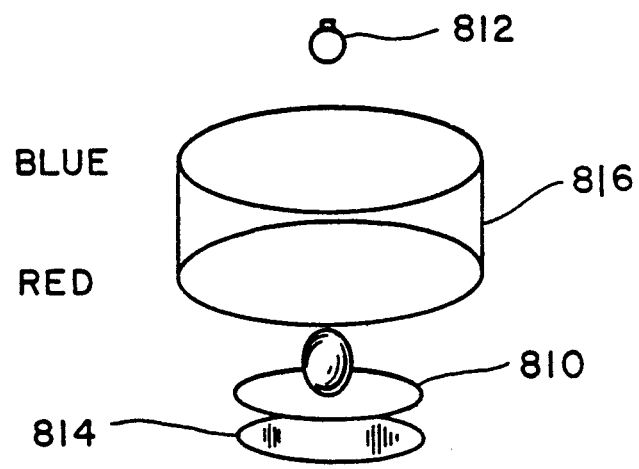
FIG. 8 is a diagram showing the window of visibility of the holographic image of an arcuate rainbow hologram under illumination by white light.

Having created the desired hologram, the end result is a flat, white-light viewable, arcuate rainbow hologram 810 that is potentially viewable from 360° when the hologram is positioned horizontally and lit by a white light source 812 from directly above or below, as shown in FIG. 8. The arcuate rainbow hologram 810 will be viewable from 360° where the information content of a wave front representing the object beam has been limited to a window that is annular, or which forms a complete circle. Any window which limits the information content of a wave front representing the object beam to a section less than that which forms a complete circle will form a corresponding window of viewability which is less than 360° by the same amount. There may be some applications where it may be practical to limit the arcuate rainbow hologram to a window less than 366°, e.g. a decorative application which is not circular or which is not necessarily viewed from 360° around its periphery. Where the hologram has been produced using an annular aperture, a flat annular master hologram, or a cylindrical shell of laser light, a viewing window 816 is a truncated cylindrical shell which floats above and around the horizontal holographic image. The viewer must look through this window to see the hologram 810. A mirror 814 may be positioned underneath the hologram 810 to allow for overhead lighting from the white light source 812. As with the conventional straight, horizontal slit rainbow hologram, the color of the holographic image is determined by the line of sight from the viewer through the rainbow window image 816 to the hologram 810. When the arcuate rainbow hologram 810 is positioned horizontally, the viewer sees a blue image that becomes red as the viewer moves downward relative to the horizontal hologram.

Figure 9:
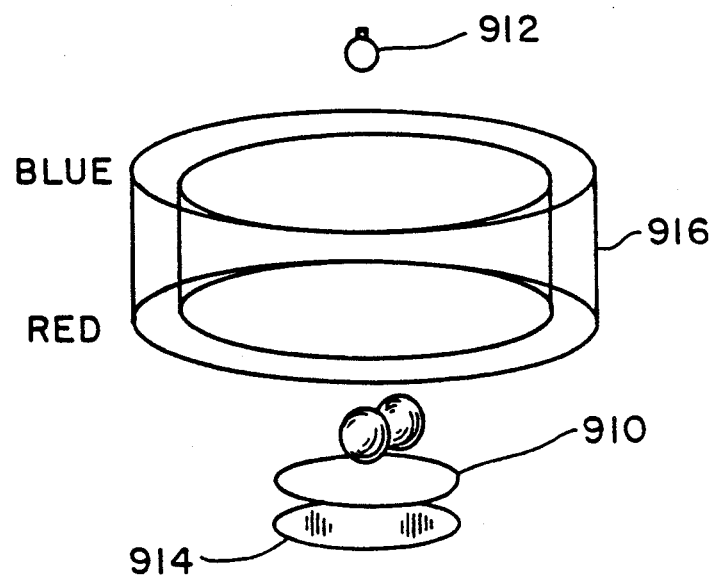
FIG. 9 is a diagram showing the window of visibility of the holographic images of a pseudo-color arcuate rainbow hologram under illumination by white light.

In the two beam two-step method and arrangement where step one is as depicted in FIGS. 4 or 5 and step two is depicted in FIG. 7, there are additional advantages to using an image-receiving surface 426 or 526 and associated master 736 whose interior and exterior diameters differ by a few inches, i.e. significantly greater than the desired illuminating beam 734. The master 736 can thus be illuminated at any diameter between the interior and exterior diameters of the master 736. Each of these diameters represent a different color angle in a final hologram. By sliding the expander cone 730 within the axicon 728 of FIG. 7, different color angles may be selected. Pseudo-color arcuate rainbow holograms may be produced by illuminating different diameters of the several masters in the multiple exposure process. Multiple exposure pseudo-color holograms may also be constructed via an illumination wavelength change (e.g., by a tunable laser) between exposures, using multiple masters of similar radius. Pseudo-color may also be constructed in one exposure with simultaneous illumination of multiple masters of differing radii. FIG. 9 shows the reconstructed multi-color arcuate rainbow hologram 910 lit by a white light source 912 with a mirror 914 positioned underneath the hologram 910 to allow for overhead lighting from the white light source 912. The line of sight from the viewer through each cylindrical window image to its associated holographic object determines the final object color. The collection of rainbow images is shown at 916 in FIG. 9.

The use of a narrow arcuate window to limit the information content of a wave front representing the object beam is also adaptable to multiplex holograms. An arcuate rainbow multiplex hologram is produced from a set of two-dimensional images. The set of two-dimensional images may record sequentially the perspectives of a real or imagined (computer generated) subject as seen by a camera positioned above or below the subject and removed from the vertical axis about which the subject is rotated in an arc or circle. The two-dimensional image set may be generated by spinning the object while recording from a fixed camera position, moving the camera in an arc or circle about a fixed object, or recording images on a stationary screen or monitor from a fixed camera position.

Figure 10:
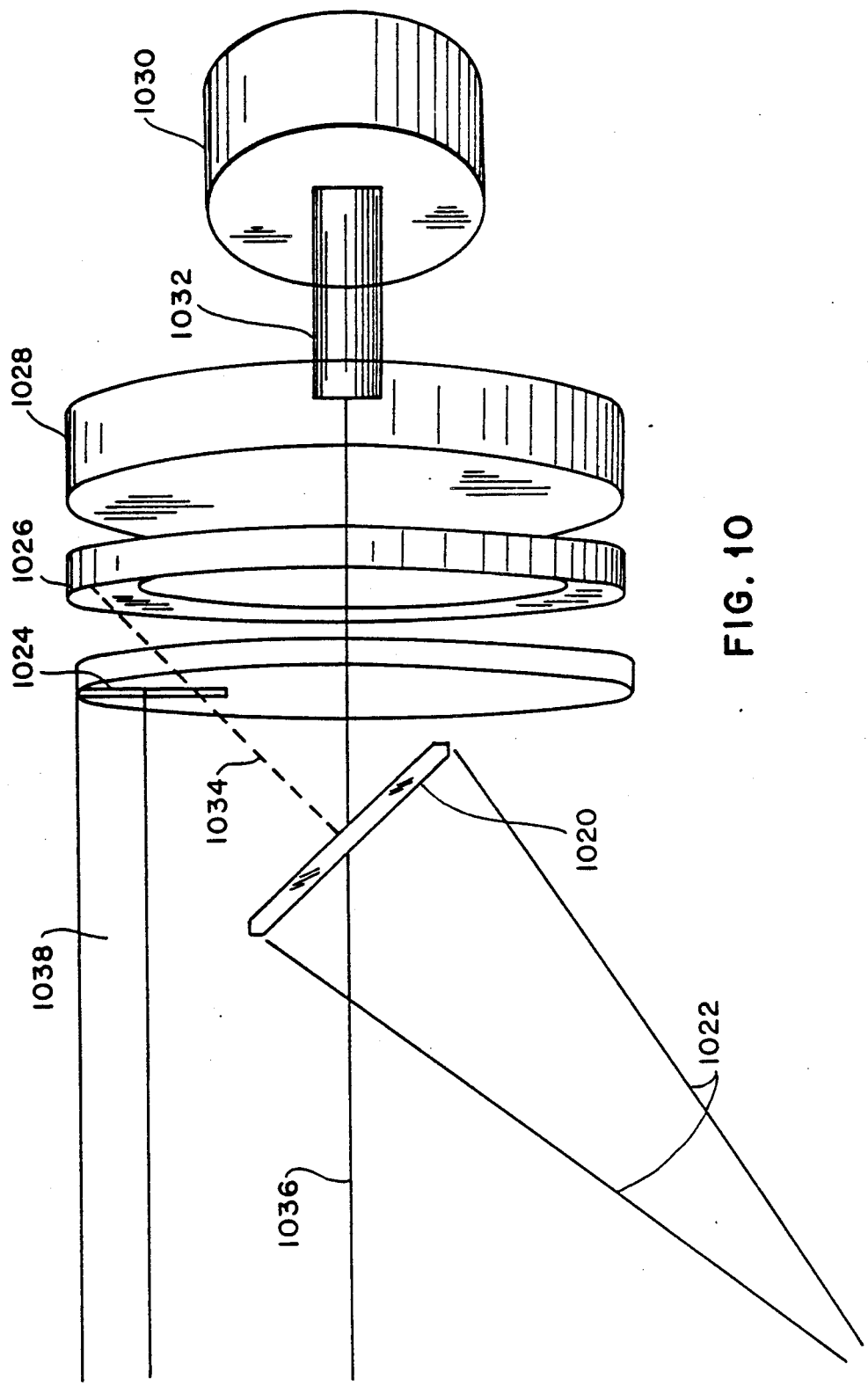
FIG. 10 is a schematic diagram of the first step in a two-step arrangement in the creation of an arcuate multiplex hologram.

To produce a two-step arcuate rainbow hologram, the arrangement of FIG. 10 is employed. The arrangement is similar to that of FIGS. 4 and 5 except that the three-dimensional object (420 or 520) is replaced with a reflective or translucent diffusion screen 1020, respectively. The screen 1020 in FIG. 10 is translucent, and so the system is otherwise analogous to that of FIG. 5. As shown in FIG. 10, the diffusion screen 1020 receives a projected two-dimensional image 1022. The image 1022 is created by illumination with a monochromatic coherent two-dimensional projector (not shown). The "object" in this case is not a singular three-dimensional subject, but rather a set of two-dimensional images that are generated according to the above-described methods. The system further comprises a radial multiplexing aperture 1024 and an arcuately shaped image-receiving surface 1026. The arcuately shaped image receiving surface 1026 is backed by a holder 1028 which may be rotated in a stepped manner by a stepping motor 1030. Motion is transferred from the stepper motor 1030 to the holder 1028 by a stepper motor shaft 1032. The diffusion screen 1020 is tilted such that an imaginary axis 1034 may be perpendicularly drawn from the surface center of the diffusion screen 1020 to the arcuately shaped image-receiving surface 1026. The diffusion screen 1020 is also positioned so that the center of the diffusion screen 1020 is on an axis 1036 which is the same axis as that about which the arcuately shaped image-receiving surface is centered. The multiplexing aperture 1024 limits the exposed portion of the image-receiving surface 1026 to a narrow wedge or short arc of the total arcuate length or circumference of the image-receiving surface 1026. When a two-dimensional image 1022 is projected onto the screen, a small hologram is produced by the interference of a reference beam 1038 with the object illumination emanating from the diffusion screen 1020. After each holographic exposure, the image-receiving surface 1026 is stepped by an angle determined by the step angle of the two-dimensional image set. A typical step between images may be one-third of a degree, so that a set of images representing a complete 360° perspective would consist of 1080 two-dimensional images. The entire two-dimensional image set is then recorded sequentially on adjacent narrow wedges or arcs of the image-receiving surface 1026 to form an H1 master. The master (626 or 736) is then illuminated as in FIGS. 6 or 7 to produce the final arcuate rainbow hologram The multiplexed master need not be circular. The multiplexed arc element set may be recorded in any spatial arrangement, e.g. in a rectangular array, a linear strip or roll of film, a rotating drum of photoreceptive material, a sequencing electronic sensor or array. It is important only that the multiplexed arc element set be reconstructed in an annular fashion.

Figure 11:
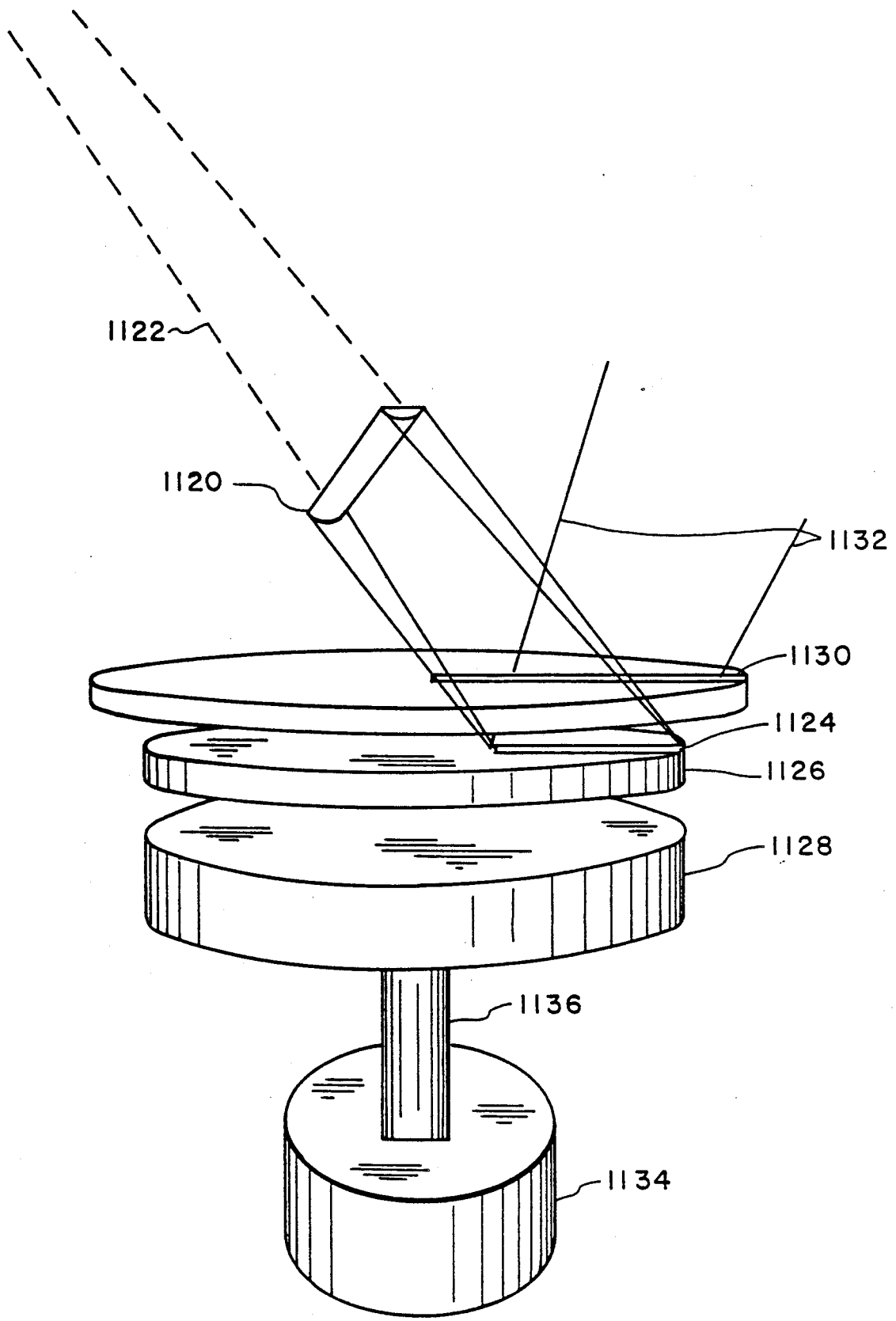
FIG. 11 is a schematic diagram of a one-step arrangement in the creation of an arcuate multiplex hologram.

An arcuate rainbow multiplex hologram may also be produced using the arrangement of FIG. 11, which is a one-step nondiffuse arcuate rainbow hologram system. Using a nondiffuse system, an arcuate rainbow multiplex hologram may be produced in one step without the need of a multiplexed H1 master. The one-step nondiffuse system comprises a low f/# optic (e.g. a cylindrical lens, a conical lens, or a holographic optical element) 1120 that will gather object illumination 1122 from a monochromatic coherent two-dimensional projector (not shown) and focus the object illumination 1122 to a radial line or narrow wedge 1124 on or near a circular image-receiving surface 1126. The image-receiving surface 1126 is backed by a holder 1128. A multiplexing aperture 1130 and a reference beam 1132 match the shape and location of the object illumination 1122 on the image-receiving surface 1126. As in the two-step arrangement, the one-step system uses a set of two-dimensional images. The image-receiving surface 1126 is stepped via a stepping motor 1134 which transfers motion to the holder 1128 and the circular image-receiving surface 1126 by a stepper shaft 1136. Each two-dimensional image is recorded upon the circular image-receiving surface 1126, the image-receiving surface 1126 being rotatably advanced by the stepping motor 1134 after each exposure so that the entire two-dimensional image set is recorded sequentially on adjacent slices of the image-receiving surface 1126. In this system, each two-dimensional object image is imaged through a narrow rainbow-generating aperture (real or synthetic) to a low f/# optic 1120 which focuses the object illumination onto a radial strip or wedge of holographic recording material. This produces an arcuate multiplex rainbow hologram that when re-illuminated with a conjugate or time-reversed reference beam produces a real orthoscopic image that floats above the film plane. The rainbow-generating aperture is therefore a synthetic point produced near the projector as the light from the projector is focused to a spot that is approximately at the focal length of the lens. The arcuate shape of the aperture is accomplished as the image-receiving surface 1126 is rotatably stepped. The addition of a spherical lens immediately behind the optic 1120 will converge the object illumination to a synthetic rainbow generating aperture on the opposite side of the film. Interfering this object illumination with a collimated or quasi-collimated reference beam perpendicular to the image-receiving surface 1126 will produce an arcuate multiplex hologram that will reconstruct a virtual image when re-illuminated by a beam similar to the reference beam used to make the hologram. For arcuate multiplex holograms with large multiplex axis angles or in which the real image floats substantially above the image-receiving surface 1126, the center region of the image-receiving surface 1126 does not record any information. For the case of the one-step arcuate rainbow hologram, the angle of the reference beam 1132 is adjustable which makes it possible to bring the reference beam 1132 in from an off-axis angle that is equal and opposite to object illumination 1122. The reference beam 1132 is preferably, though not necessarily at an off-axis angle that is equal and opposite to object illumination 1122. Advantages of such a geometry are discussed in U.S. Pat. No. 4,415,225 issued to Benton at lines 54–65 of column 8. This also allows the construction of multiplex holograms that are lit from directly above or below by a very close re-illumination source. That is, a large aperture multiplexed converging reference beam is easy to generate. The one-step arcuate rainbow multiplex hologram therefore has advantages in that the system is linear rather than cylindrical and consequently does not require a large aperture optic or master hologram. The reference beam is also multiplexed, which facilitates the production of highly converging reference beams and holograms with equal and opposite reference and object beam angles.

Figure 12:
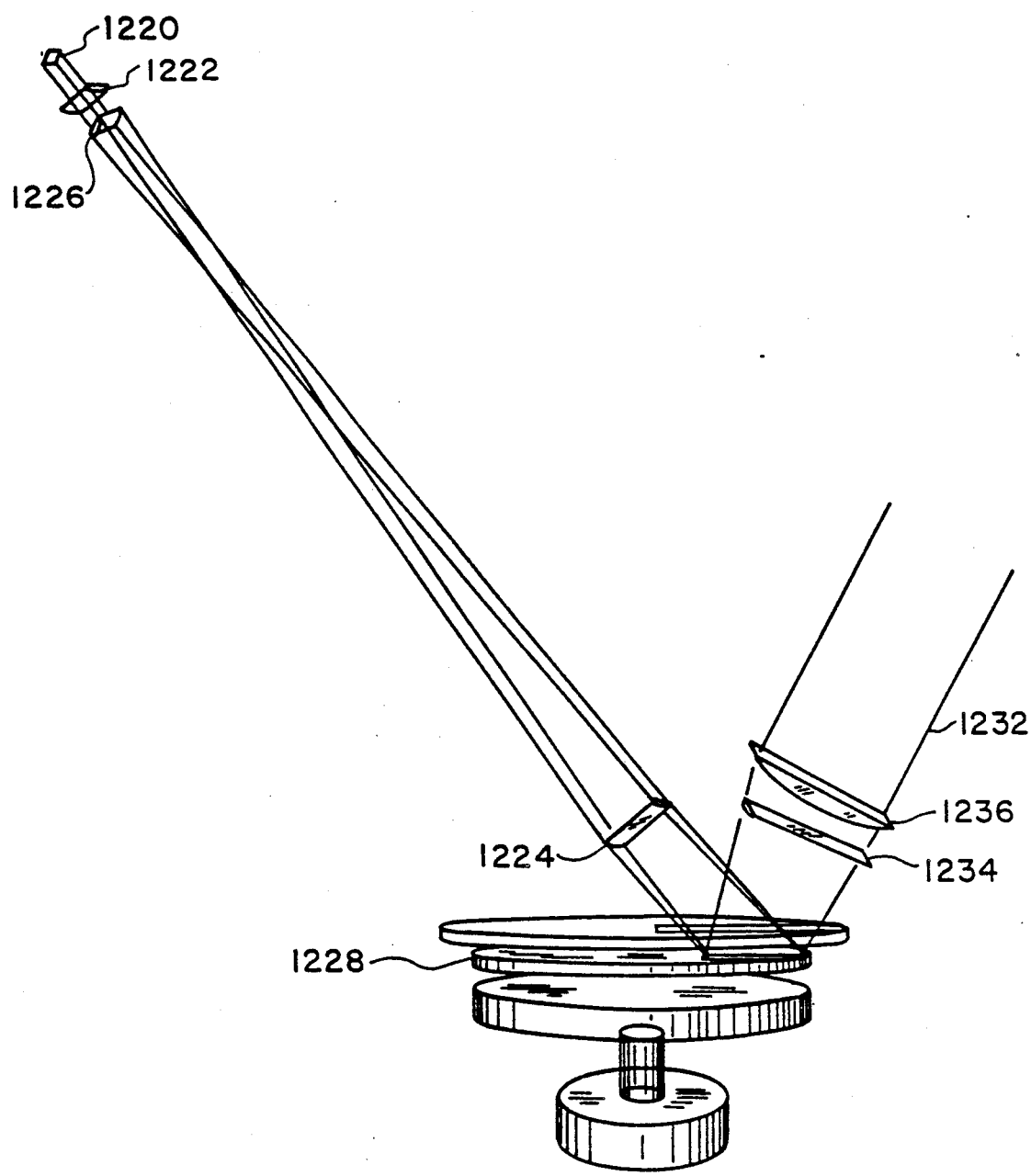
FIG. 12 is a schematic diagram of an anamorphic one-step arrangement in the creation of an arcuate rainbow mutliplex hologram.

An extension of the one-step nondiffuse rainbow multiplex hologram is to use an anamorphic system in which the vertical and horizontal information of the two-dimensional images are processed independently. Anamorphic systems are known in the art, see, e.g. U.S. Pat. Nos. 4,206,965 and 4,429,946 issued to McGrew and Haines, respectively. FIG. 12 shows the adaptation of an anamorphic system to an arrangement for producing a one-step arcuate rainbow multiplex hologram. A two-dimensional image 1220 is projected from a monochromatic coherent two-dimensional projector (not shown). A vertically oriented cylindrical lens 1222 focuses the vertical information lines of the two-dimensional image 1220 to a conical lens 1224. The conical lens 1224 consequently has no effect on these vertical image components. A horizontally oriented cylindrical lens 1226 focuses the horizontal image lines to the holographic film plane. The conical lens 1224 serves to focus the object illumination from the image 1220 to a radial line or wedge near a circular image receiving surface 1228. A reference beam 1232 has horizontal and vertical divergence or convergence angles that are independently processed by cylindrical lenses 1234 and 1236, respectively. In this fashion, the horizontal and vertical image components of the image appear recombined in the final hologram. Additionally, a large aperture spherical lens may be used as a collimator to aid in the formation of the rainbow generating horizontal slit aperture. Upon re-illumination, the rainbow generating slit image location is a function of the vertical focal power of the system as determined by the locations and vertical focal powers of: the re-illuminating point source; the horizontal cylindrical lens elements in the object beam; the horizontal cylindrical lens elements in the reference beam; and the spherical collimating lens. Thus, real image or virtual image holograms may be made by locating the rainbow aperture image on one side of the film or the other. The system differs from those described by McGrew and Haines only in that holographic film plane is no longer perpendicular in the multiplexing axis. This necessitates the use of a conical or similar optic to focus the object illumination to a wedge or radial line of the holographic recording medium as described above. By focusing the object illumination to or through a narrow rainbow generating aperture as described in the previous section, the anamorphic multiplexing system may similarly produce either a real or virtual image. Using a nondiffuse anamorphic multiplexing system offers the advantage of processing independently the vertical and horizontal information of each two-dimensional image. This makes it possible to replace the large aperture optics with long narrow optics. An added advantage is that the horizontal and vertical information planes may be located so as to reduce chromatic dispersion and distortions due to lens aberrations, respectively.

Figure 13A:
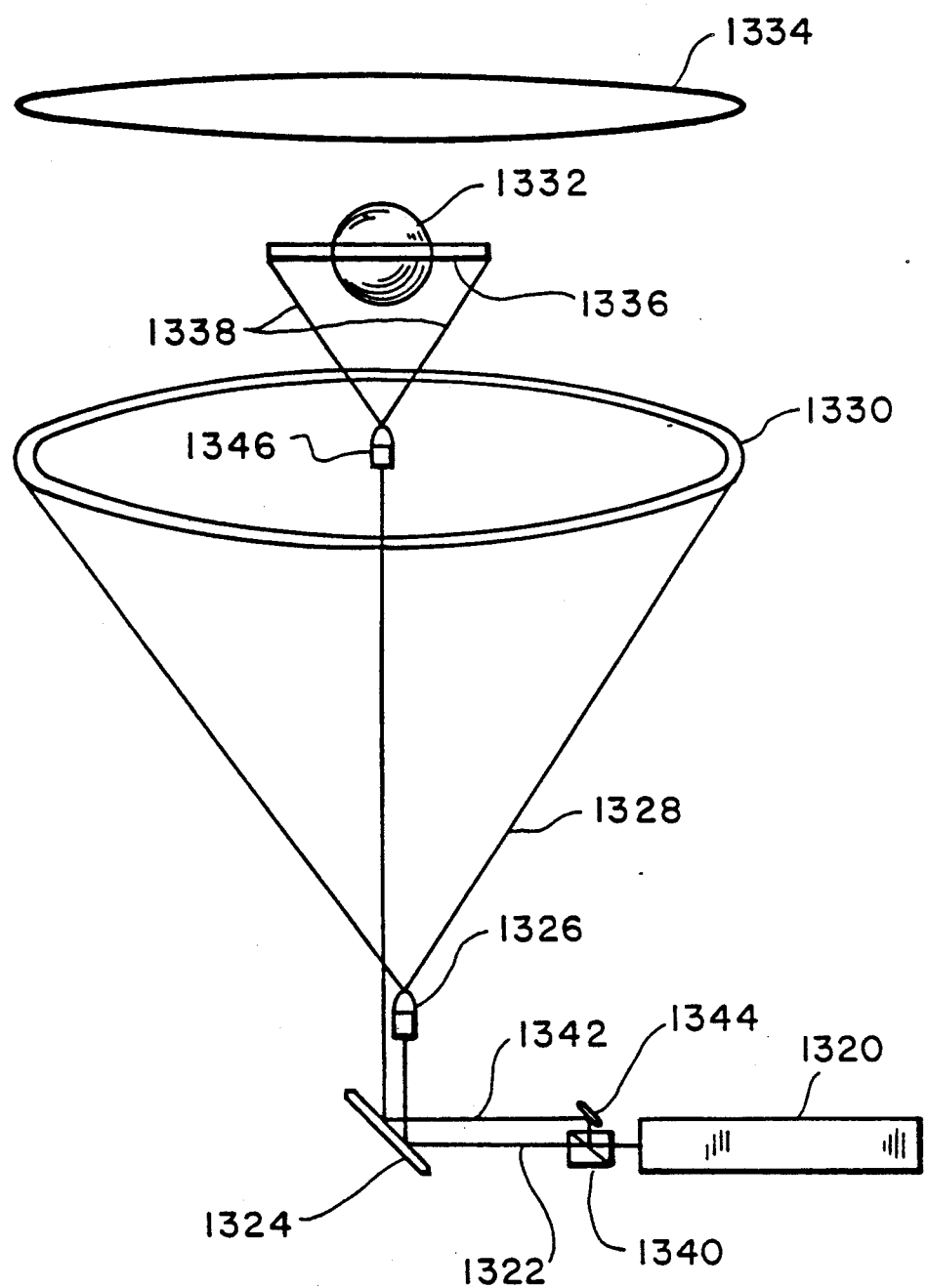
FIG. 13A is a schematic diagram of a two beam arrangement for producing an image plane copy from an arcuate rainbow multiplex hologram, a beam splitter being used to split a monochromatic coherent light source into a reference beam and an illuminating beam.
Figure 13B:
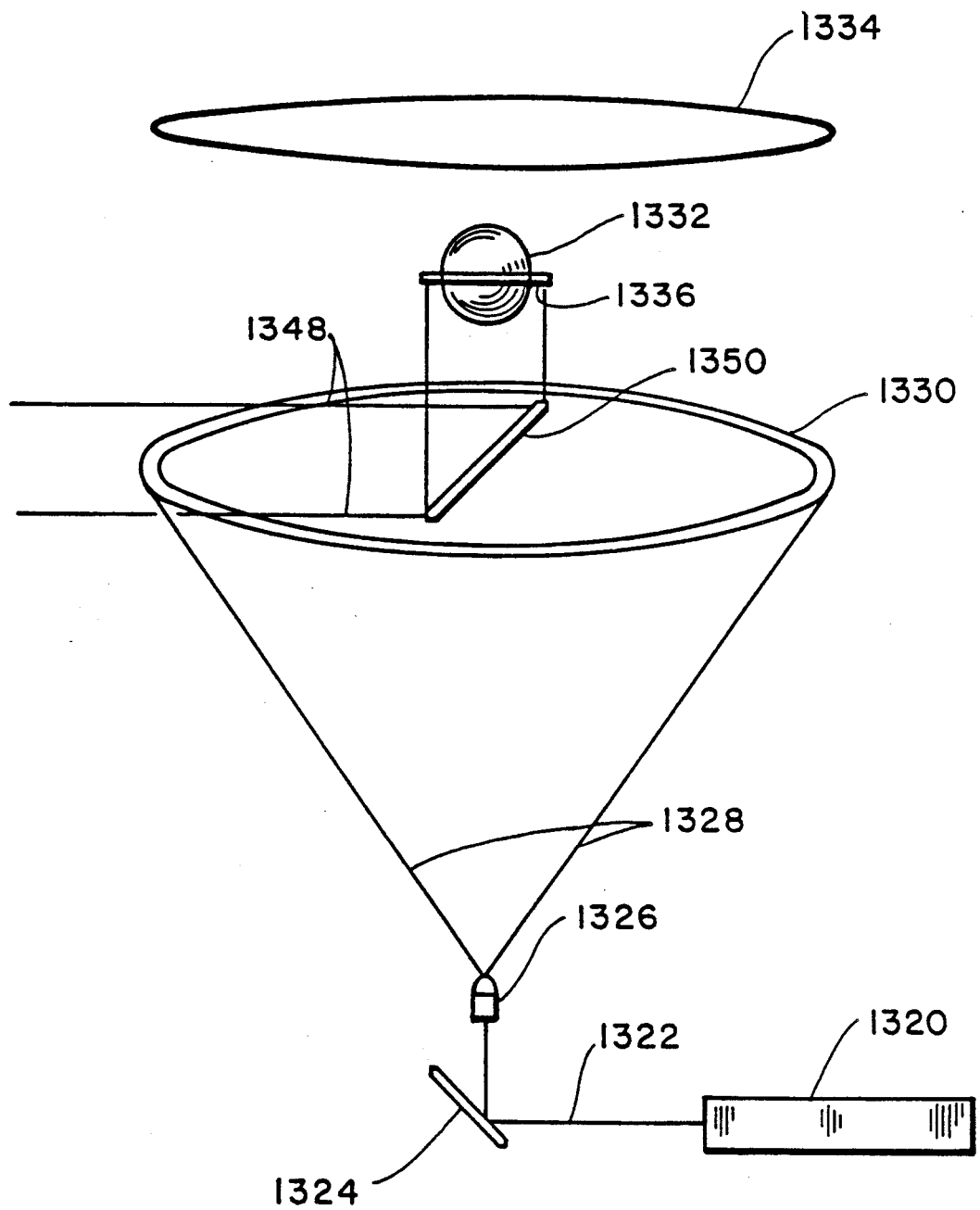
FIG. 13B is a schematic diagram of an alternate two beam arrangement for producing an image plane copy from an arcuate rainbow multiplex hologram using a collimated side reference beam.
Figure 13C:
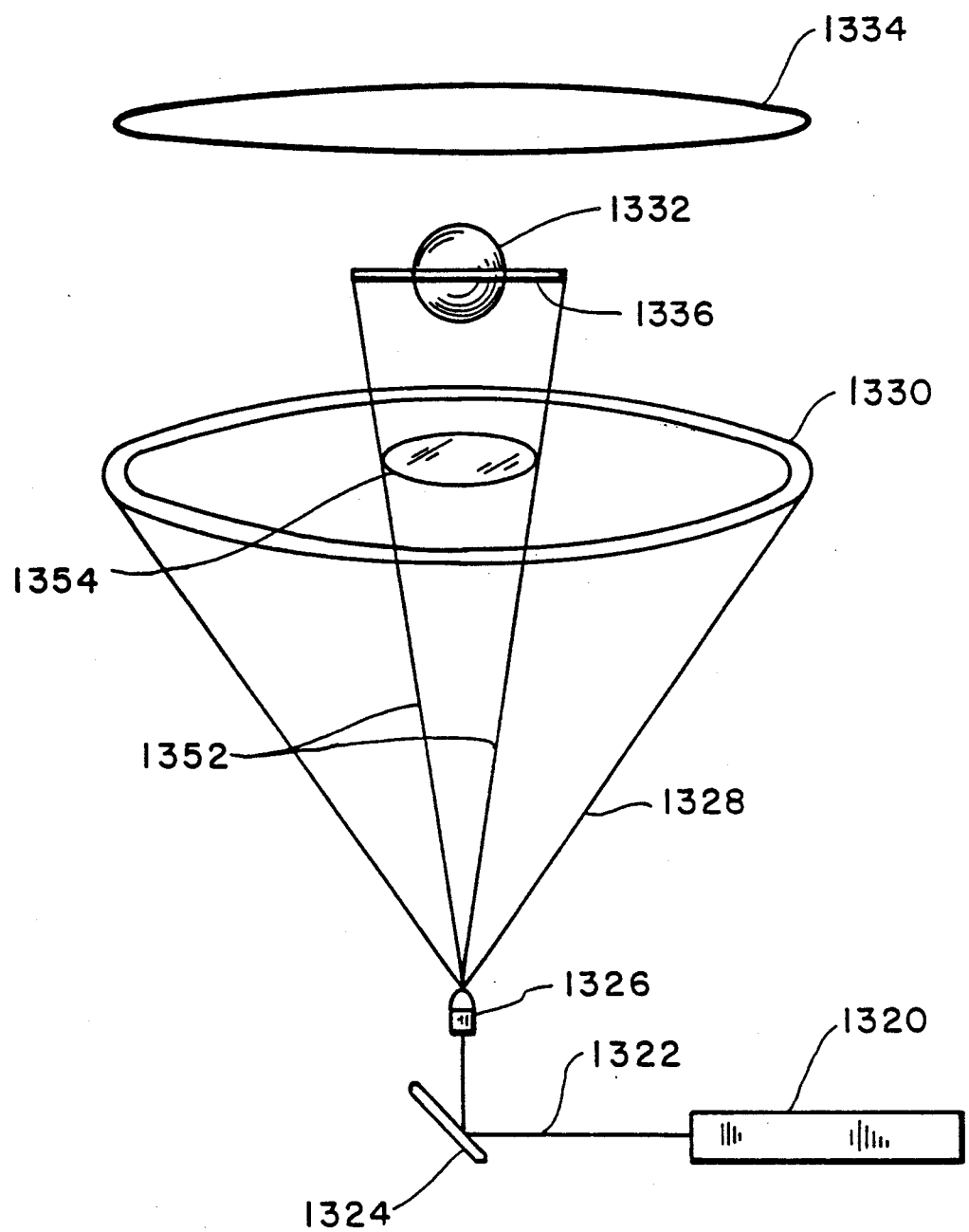
FIG. 13C is a schematic diagram of a single beam arrangement for producing an image plane copy from an arcuate rainbow multiplex hologram.

The one-step arcuate rainbow multiplex hologram geometry shown in FIG. 11 produces a real image that floats above the image-receiving surface 1126. If an image plane hologram is desired or if an image that appears below the film plane is desired, then a copy of an arcuate rainbow hologram may be made in the following manner. As shown in FIG. 13A, a laser 1320 produces a beam 1322 of monochromatic coherent light which is reflected off of a mirror 1324 and directed into an expander lens 1326 to produce a divergent illuminating beam 1328. The illuminating beam 1328 illuminates a master 1330 developed from the image-receiving surface 1126 to produce a multiplex parallax limited real image 1332 and synthesized arc ring image 1334. A second image-receiving surface 1336 is positioned proximate to the multiplex real image 1332. The second image-receiving surface 1336 may be positioned so that the real image 1332 may be located above, below, or in the film plane. In FIG. 13A, the real image 1332 is located in the film plane. A reference beam 1338 is directed to impinge upon the second image-receiving surface 1336 and interferes with the real image 1332. The optical interference of the reference beam 1338 and the reconstructing beam which forms the real image 1332 creates an interference pattern uniquely related to the set of two-dimensional images. The interference pattern records, during one exposure, the combined interference of all of the two-dimensional images with the reference beam 1338. This eliminates the radial wedge multiplexing at the final film plane. The reference beam originates from the laser 1320, the monochromatic coherent light beam 1322 being split at a beam splitter 1340 to form a second beam 1342. The beam 1342 is routed to reflect off of a mirror 1344 and the mirror 1324 until it enters an expander lens 1346. After passing through the expander lens 1346, the beam 1346 is diverged to form the reference beam 1338. If the arcuate multiplex hologram is one in which the center circular region of the arcuate multiplex does not record any information (as described above) the reference beam may be collimated and brought in from the side at 1348 and reflected off of a mirror 1350 to impinge upon the second image-receiving surface 1336 as depicted in FIG. 13B, or the reference beam may be brought up through the central circular zone of the one-step arcuate multiplex hologram at 1352 as depicted in FIG. 13C so as to be directed at an imaging lens 1354 which directs the reference beam 1352 to impinge upon the second image-receiving surface 1336. The second image-receiving surface 1336 does not need to be much larger than the holographic image 1332. The hologram developed from the second image-receiving surface 1336 is re-illuminated by a reference beam that has the same configuratons reference beam 1336 that was used to construct the hologram, rather than a time-reversed reference beam which is used to re-illuminate holograms.

It should be apparent from the above description that other arrangements and geometries are possible that fall within the scope of the present invention. For example, the information content of a wave front representing the reflection of the illuminated object may be limited by an arcuate aperture, an arcuate image-receiving surface or photographic plate, or by an annular ring refrence beam or reconstruction beam. With certain adjustments, these means of limiting ay be substitutable between and among themselves, or other means may be employed which effectively serve to limit the information content by the forming of a window through which a selected portion of the wave front is preserved. Further, the window need not be annular or form a complete circle, but rather an arcuate window and subsets thereof (which include circles, half-circles, and other annular or arcuate geometries) are considered within the scope of the present invention. The invention is also not limited to the visible section of the electromagnetic spectrum, but many also apply to ultraviolet radiations, infrared, X-rays, radar, etc. It is to be therefore understood that the invention is not confined to the particular construction and arrangement of parts herein illustated and described, but embraces such modified forms thereof as come within the scope of the following claims.

What is claimed is:

1. A method for making a hologram of an object comprising the steps of:
   (a) limiting the information content of a wave front of coherent light representing the object to a selected portion of the wave front the selected portion forming an arcuate window through which the selected portion is preserved and the window having a length substantially greater than its thickness;
   (b) deriving an information-limited image of the object from the information-limited wave front; and,
   (c) recording the image on an image-receiving surface.

2. The method of claim 1 wherein the window is a complete circumference of a circle.

3. The method of claim 1 wherein the window is a circumference of a half-circle.

4. The method of claim 1 wherein the information content of the wave front representing the object is limited by occluding all but the selected portion through an arcuate aperture having a length substantially greater than its thickness.

5. The method of claim 4 wherein the aperture is annular.

6. The method of claim 1 wherein the information content of the wave front representing the object is limited by the further steps of:
   (a) intermediately recording the wave front representing the object and a reference waveform upon an arcuate image-receiving surface to form a master and;
   (b) illuminating the master with an illuminating waveform to form an image that is to be recorded.

7. The method of claim 6 wherein the image-receiving surface is annular.

8. The method of claim 6 wherein the information content of the wave front representing the object is limited by the further steps of:
   (a) intermediately recording the wavefront representing the object and a reference waveform upon an image-receiving surface to form a master;

(b) illuminating the master with an illuminating wave front to form the image that is to be recorded, the illuminating waveform being propagated in an arcuate geometry.

9. The method of claim 8 wherein the arcuate geometry of the illuminating waveform is formed by a cylindrical shell of laser light.

10. The method of claim 9 wherein the cylindrical shell of laser light is produced by an axicon.

11. The method of claim 10 wherein the aperture is annular.

12. The method of claim 1 wherein the information content of the wave front representing the object is limited by the further steps of:
(a) intermediately recording the wave front representing the object and a reference waveform having an arcuate geometry upon an image-receiving surface to form a master; and
(b) illuminating the master with an illuminating waveform to form an image that is to be recorded.

13. The method of claim 1 wherein the object is an opaque three-dimensional subject and wherein the formation of the wave front of coherent light representing the object is formed by the further step of illuminating the object with coherent light to create a reflection therefrom having a given information content.

14. The method of claim 1 wherein the object is a translucent three-dimensional subject and wherein the formation of the wave front of coherent light representing the object is formed by the further step of illuminating the object with coherent light to create a diffraction therefrom having a given information content.

15. The method of claim 1 wherein the object is a set of two-dimensional images and wherein the formation of the wave front of coherent light representing the object is formed by the further steps of:
(a) projecting and exposing each of the images on a short arc of an image-receiving surface; and
(b) rotatably stepping the image-receiving surface after projecting and exposing each of the images to create an arcuate array of two-dimensional images.

16. The method of claim 15 wherein a multiplexing aperture positioned radial to the stepping movement of the image-receiving surface is used to limit the projecting and exposing of each of the two-dimensional images to a short arc of the image-receiving surface.

17. The method of claim 15 wherein an arcuate aperture is synthesized by a lens arrangement that converges each of the two-dimensional images at approximately a focal point of the image projecting, combined with the stepping movement.

18. The method of claim 17 wherein the vertical and horizontal information of each two-dimensional image is processed independently.

19. A method for making a hologram of an object comprising the steps of:
(a) limiting the information content of a wave front of coherent light representing the object by occluding all but a selected portion through an arcuate aperture having a length substantially greater than its thickness;
(b) forming an information-limited real image of the object from the information-limited wave front;
(c) combining the information-limited real image with a reference wave front of light having a select phase relationship with the information-limited wave front to form an interference pattern;
(d) positioning an image-receiving surface proximate to the information-limited real image; and
(e) recording the interference pattern on the image-receiving surface.

20. A method for making a hologram of an object comprising the steps of:
(a) receiving a wave front representing the object on an arcuate image-receiving surface;
(b) interfering a first coherent reference light having selected waveform and direction with the wave front representing the object at the image-receiving surface to form a master;
(c) illuminating the master with an illuminating waveform to form an image that is to be recorded;
(d) receiving the information-limited image on a second image-receiving surface proximate to the information-limited real image;
(e) interfering a second coherent reference light having selected form and direction with the information-limited real image at the second image receiving surface to form an information-limited holographic image; and
(f) recording the interference pattern on the image-receiving surface.

21. A method for making a hologram of an object comprising the steps of:
(a) recording the wave front representing the object and a reference waveform upon an image-receiving surface to form a master;
(b) illuminating the master with an illuminating wave front to form an image that is to be recorded, the illuminating wave front being propagated in an arcuate geometry;
(c) combining the image with a second reference waveform having a select phase relationship with the illuminating wave front to form an interference pattern:
(d) positioning an image-receiving surface proximate to the real image; and
(e) recording the interference pattern on the image-receiving surface.

22. The method of claim 21 wherein the arcuate geometry of the illuminated waveform is a cylindrical shell of laser light.

23. The method of claim 22 further comprising the steps of:
(a) adjusting the cylindrical shell of laser light to varying radii; and
(b) recording a multiple exposure upon the image-receiving surface, each of the individual exposures resulting from an interference pattern formed by a respective radius of the cylindrical shell of laser light.

24. The method of claim 22 further comprising the steps of:
(a) illuminating the master with illuminating wave fronts of varying wavelengths; and
(b) recording a multiple exposure upon the image-receiving surface, each of the individual exposures resulting from an interference pattern formed by a respective interference between the second reference waveform and an illuminating wavefront of a particular wavelength.

25. The method of claim 24 wherein the illumination of the master is performed simultaneously.

26. The method of claim 21 wherein the cylindrical shell of laser light is produced by an axicon.

27. A method for making a hologram of an object comprising the steps of:
   (a) receiving a wave front representing the object on an image-receiving surface;
   (b) interfering a first coherent reference light having an arcuate geometry with the wave front representing the object at the image-receiving surface to form a master;
   (c) illuminating the master with an illuminating waveform to form an image that is to be recorded;
   (d) receiving the information-limited image on a second image-receiving surface proximate to the information-limited real image;
   (e) interfering a second coherent reference light having selected form and direction with the information-limited real image at the second image receiving surface to form an information-limited holographic image; and
   (f) recording the interference pattern on the image-receiving surface.

28. Apparatus for making a hologram of an object comprising:
   (a) means for generating a coherent beam of light that forms a reference beam; the reference beam being directed toward an image receiving surface;
   (b) means for generating a wave front of coherent light representing the object to be recorded, the wave front representing the object having a given information content;
   (c) means for limiting the information of a wave front representing the object to a selected portion of the wave front, the means forming an arcuate window through which the selected portion is preserved and the window having a length substantially greater than its thickness; and
   (d) recording means that receive the reference wave front and the information-limited wave front representing the object.

29. The apparatus of claim 28 wherein the window is a complete circumference of a circle.

30. The apparatus of claim 28 wherein the window is a circumference of a half-circle.

31. The apparatus of claim 28 further comprising an arcuate aperture having a length substantially greater than its thickness placed in the path of the wave front representing the object so as to limit the information content of the wave front by occluding all but the selected portion.

32. The apparatus of claim 31 wherein the aperture is annular.

33. The apparatus of claim 28 wherein the image-receiving surface shaped as an arc to form a master from which the hologram is formed.

34. The apparatus of claim 33 wherein the image-receiving surface is annular.

35. The apparatus of claim 33 wherein the means for generating the wavefront of coherent light representing the object to be recorded includes an axicon.

36. A hologram of an object prepared by a process comprising the steps of:
   (a) illuminating the object with coherent light to create a reflection therefrom having a given information content;
   (b) limiting the information content of a wave front representing the reflection of the illuminated object to a selected portion of the wave front, the selected portion forming an arcuate window through which the selected portion is preserved and the window having a length substantially greater than its thickness;
   (c) deriving an information-limited image of the object from the information-limited wave front; and
   (d) recording the image on an image-receiving surface.

37. The hologram of claim 36 prepared by a process wherein the window is a complete circumference of a circle 38. The hologram of claim 36 prepared by a process wherein the window is a circumference of a half-circle.

39. The hologram of claim 36 prepared by a process wherein the information content of the wave front representing the object is limited by occluding all but the selected portion through an arcuate aperture having a length substantially greater than its thickness.

40. The hologram of claim 39 prepared by a process wherein the aperture is annular.

41. The hologram of claim 36 prepared by a process wherein the information content of the Wave front representing the reflection of the illuminated object is limited by the further steps of:
   (a) intermediately recording the wave front representing the object and a reference waveform upon an arcuate image-receiving surface to form a master and;
   (b) illuminating the master with an illuminating waveform to form an image that is to be recorded 42. The hologram of claim 41 prepared by a process wherein the image-receiving surface is annular.

43. The hologram of claim 36 prepared by a process wherein the information content of the wave front representing the object is limited by the further steps
   (a) intermediately recording the wavefront representing the object and a reference waveform upon an image-receiving surface to form a master;
   (b) illuminating the master with an illuminating wave front to form the image that is to be recorded, the illuminating waveform being propagated in an arcuate geometry.

44. The hologram of claim 43 prepared by a process wherein the arcuate geometry of the illuminating waveform is formed by a cylindrical shell of laser light.

45. The hologram of claim 44 prepared by a process wherein the cylindrical shell of laser light is produced by an axicon.

46. The hologram of claim 36 wherein the information content of the wave front representing the object is limited b the further steps of:
   (a) intermediately recording the wave front representing the object and a reference waveform having an arcuate geometry upon an image-receiving surface to form a master; and
   (b) illuminating the master with an illuminating waveform to form an image that is to be recorded.

47. The hologram of claim 36 prepared by a process wherein the object is an opaque three-dimensional subject and wherein the formation of the wave front of coherent light representing the object is formed by the further step of illuminating the object with coherent light to create a reflection therefrom having a given information content.

48. The hologram of claim 36 wherein the object is a translucent three-dimensional subject and wherein the formation of the wave front of coherent light representing the object is formed by the further step of illuminating the object with coherent light to create a diffraction therefrom having a given information content.

49. The hologram of claim 36 wherein the object is a set of two-dimensional images and wherein the formation of the wave front of coherent light representing the object is formed by the further steps of:
   (a) projecting and exposing each of the images on a short arc of an image-receiving surface; and
   (b) rotatably stepping the image-receiving surface after projecting and exposing each of the images to create an arcuate array of two-dimensional images.

50. The hologram of claim 49 wherein a multiplexing aperture positioned radial to the stepping movement of the image-receiving surface is used to limit the projecting and exposing of each of the two-dimensional images to a short arc of the image-receiving surface.

51. The hologram of claim 49 wherein an arcuate aperture is synthesized by a lens arrangement that converges each of the two-dimensional images at approximately a focal point of the image projecting, combined with the stepping movement.

52. The hologram of claim 51 wherein the vertical and horizontal information of each two-dimensional image is processed independently.

53. A hologram of an object prepared by a process comprising the steps of:
   (a) limiting the information content of a wave front of coherent light representing the object by occluding all but a selected portion through an arcuate aperture having a length substantially greater than its thickness;
   (b) forming an information-limited real image of the object from the information-limited wave front;
   (c) combining the information-limited real image with a reference wave front of light having a select phase relationship with the information-limited wave front to form an interference pattern;
   (d) positioning an image-receiving surface proximate to the information-limited real image; and
   (e) recording the interference pattern on the image-receiving surface.

54. The hologram of claim 53 prepared by a process wherein the aperture is annular.

55. A hologram of an object prepared by a process comprising the steps of:
   (a) receiving a wave front representing the object on an arcuate image-receiving surface;
   (b) interfering a first coherent reference light having selected waveform and direction with the wave front representing the object at the image-receiving surface to form a master;
   (c) illuminating the master with an illuminating waveform to form an image that is to be recorded;
   (d) receiving the information-limited image on a second image-receiving surface proximate to the information-limited real image; and
   (e) interfering a second coherent reference light having selected form and direction with the information-limited real image at the second image receiving surface to form an information-limited holographic image; and
   (f) recording the interference pattern on the image-receiving surface.

56. A hologram of an object prepared by a process comprising the steps of:
   (a) recording the wave front representing the object and a reference waveform upon an image-receiving surface to form a master;
   (b) illuminating the master with an illuminating wave front to form an image that is to be recorded, the illuminating wave front being propagated in an arcuate geometry;
   (c) combining the image with a second reference waveform having a select phase relationship with the illuminating wave front to form an interference pattern;
   (d) positioning an image-receiving surface proximate to the real image; and
   (e) recording the interference pattern on the image-receiving surface.

57. The hologram of claim 56 prepared by a process wherein the arcuate geometry of the illuminating waveform is a cylindrical shell of laser light.

58. The hologram of claim 57 prepared by a process further comprising the steps of:
   (a) adjusting the cylindrical shell of laser light to varying radii; and
   (b) recording a multiple exposure upon the image-receiving surface, each of the individual exposures resulting from an interference pattern formed by a respective radius of the cylindrical shell of laser light.

59. The hologram of claim 57 prepared by a process further comprising the steps of:
   (a) illuminating the master with illuminating wave fronts of varying wavelengths; and
   (b) recording a multiple exposure upon the image-receiving surface, each of the individual exposures resulting from an interference pattern formed by a respective interference between the second reference waveform and an illuminating wavefront of a particular wavelength.

60. The hologram of claim 59 prepared by a process wherein the illumination of the master is performed simultaneously.

61. The hologram of claim 56 wherein the cylindrical shell of laser light is produced by an axicon.

62. A hologram of an object prepared by a process comprising the steps of:
   (a) receiving a wave front representing the object on an image-receiving surface;
   (b) interfering a first coherent reference light having an arcuate geometry with the wave front representing the object at the image-receiving surface to form a master;
   (c) illuminating the master with an illuminating waveform to form an image that is to be recorded;
   (d) receiving the information-limited image on a second image-receiving surface proximate to the information-limited real image;
   (e) interfering a second coherent reference light having selected form and direction with the information-limited real image at the second image receiving surface to form an information-limited holographic image; and
   (f) recording the interference pattern on the image-receiving surface.

* * * * *